June 23, 1970  H. FOCKE ET AL  3,516,214
APPARATUS FOR CONTINUOUSLY COLLECTING ELONGATED ARTICLES
Filed April 28, 1966  7 Sheets-Sheet 1
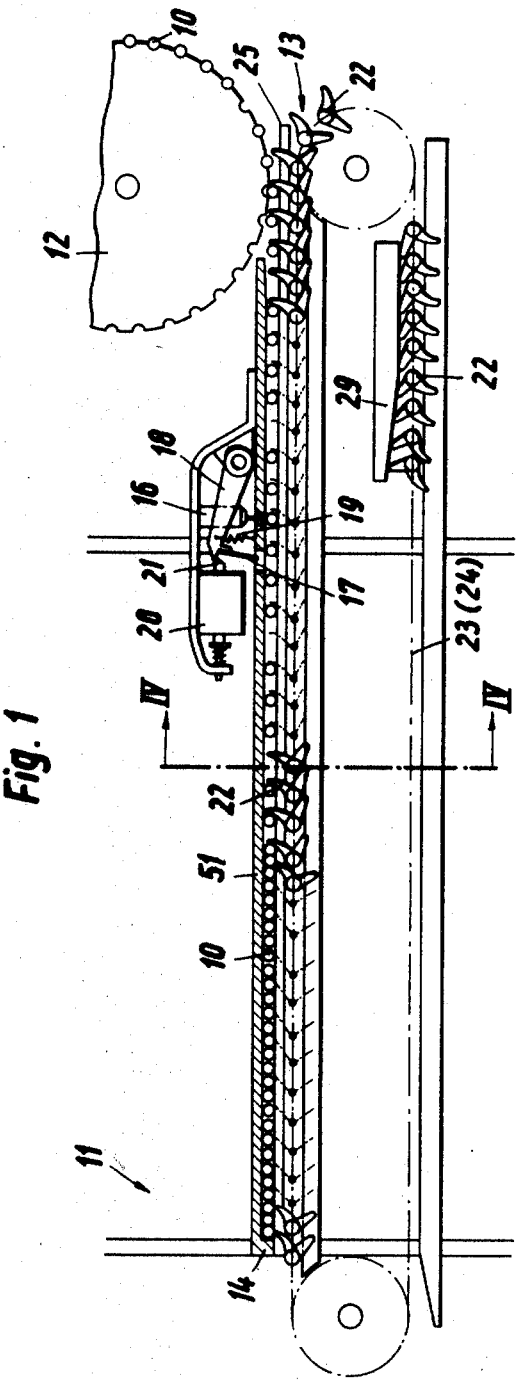
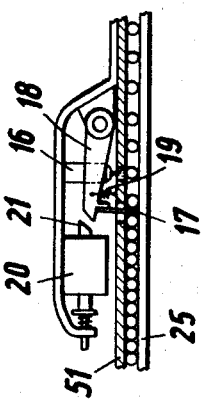
INVENTORS
Heinz Focke
Kurt Liedtke &
Horst Friedhoff
BY
ATTORNEY

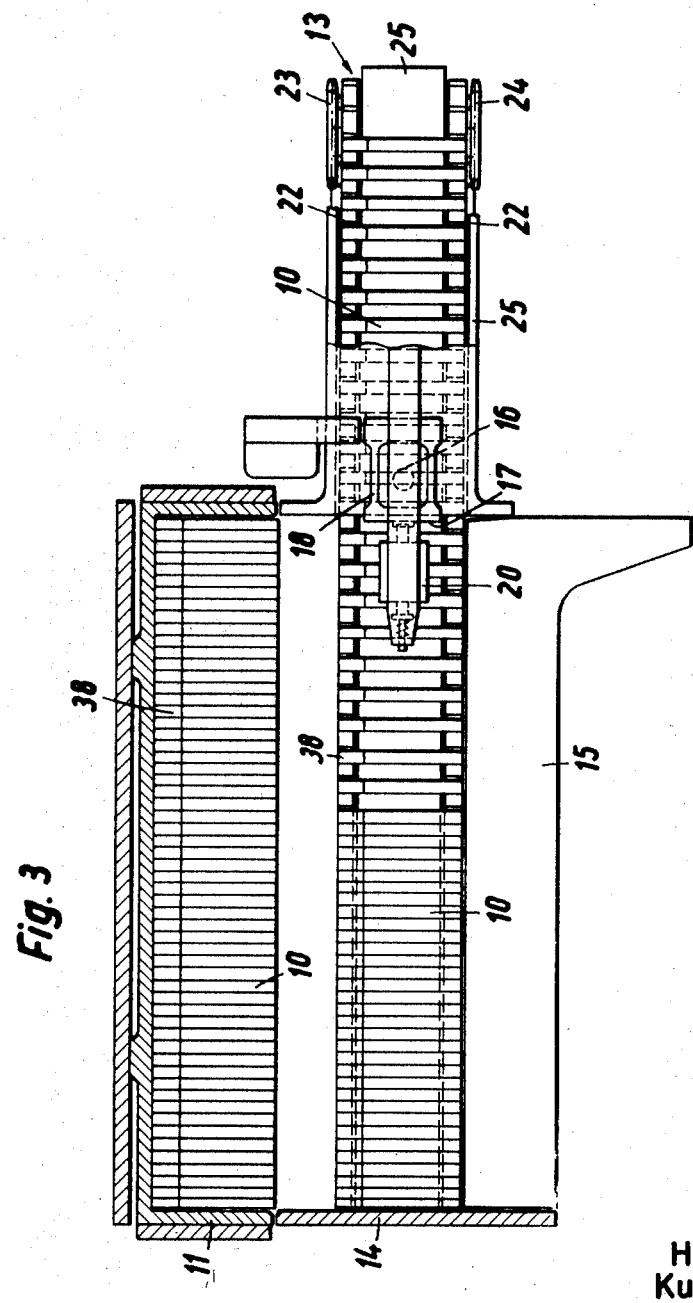

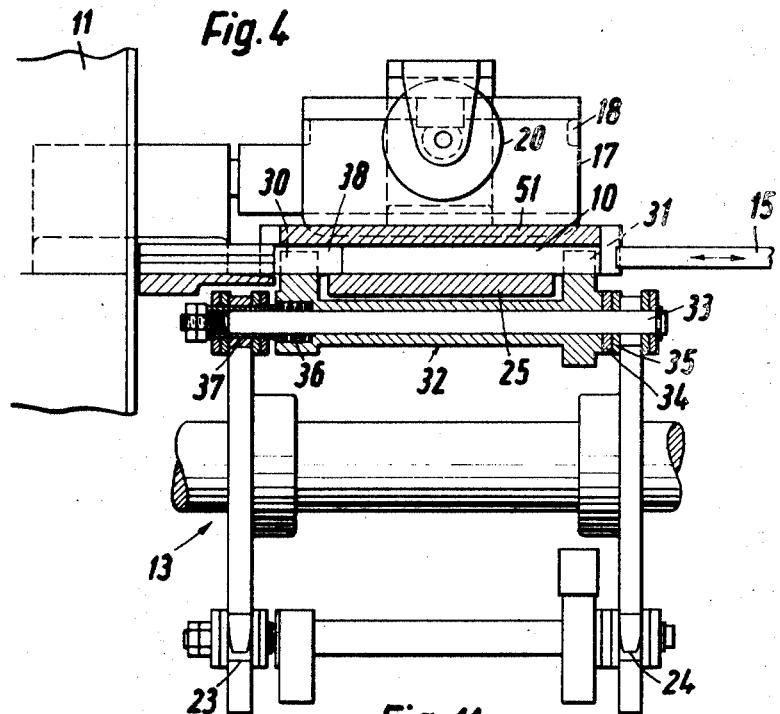
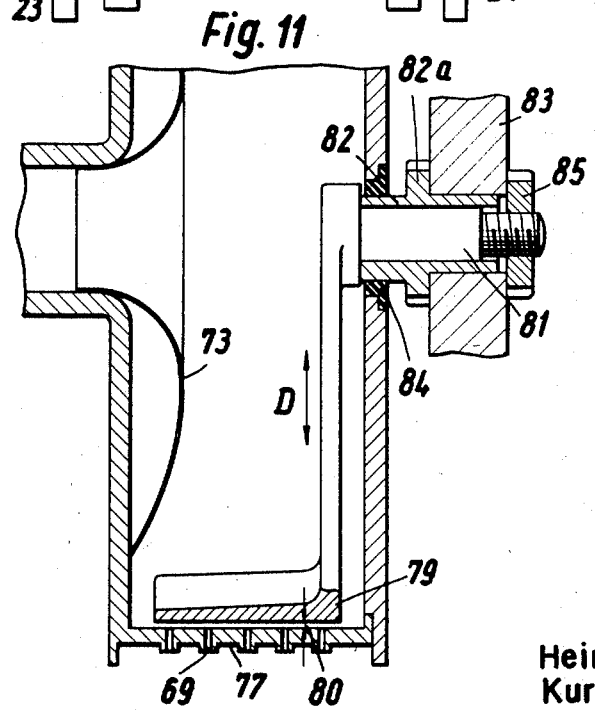

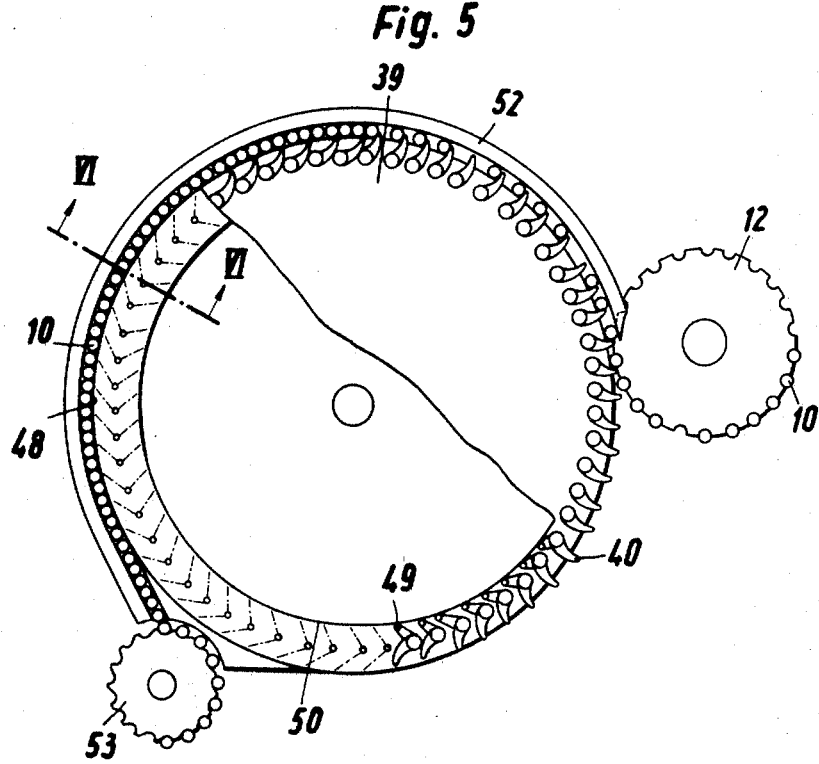
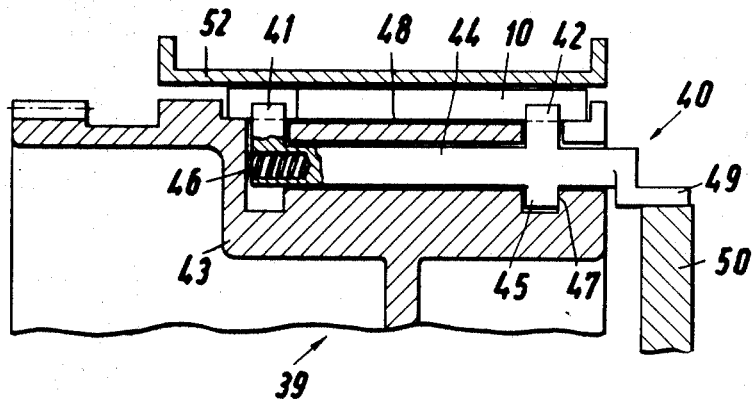

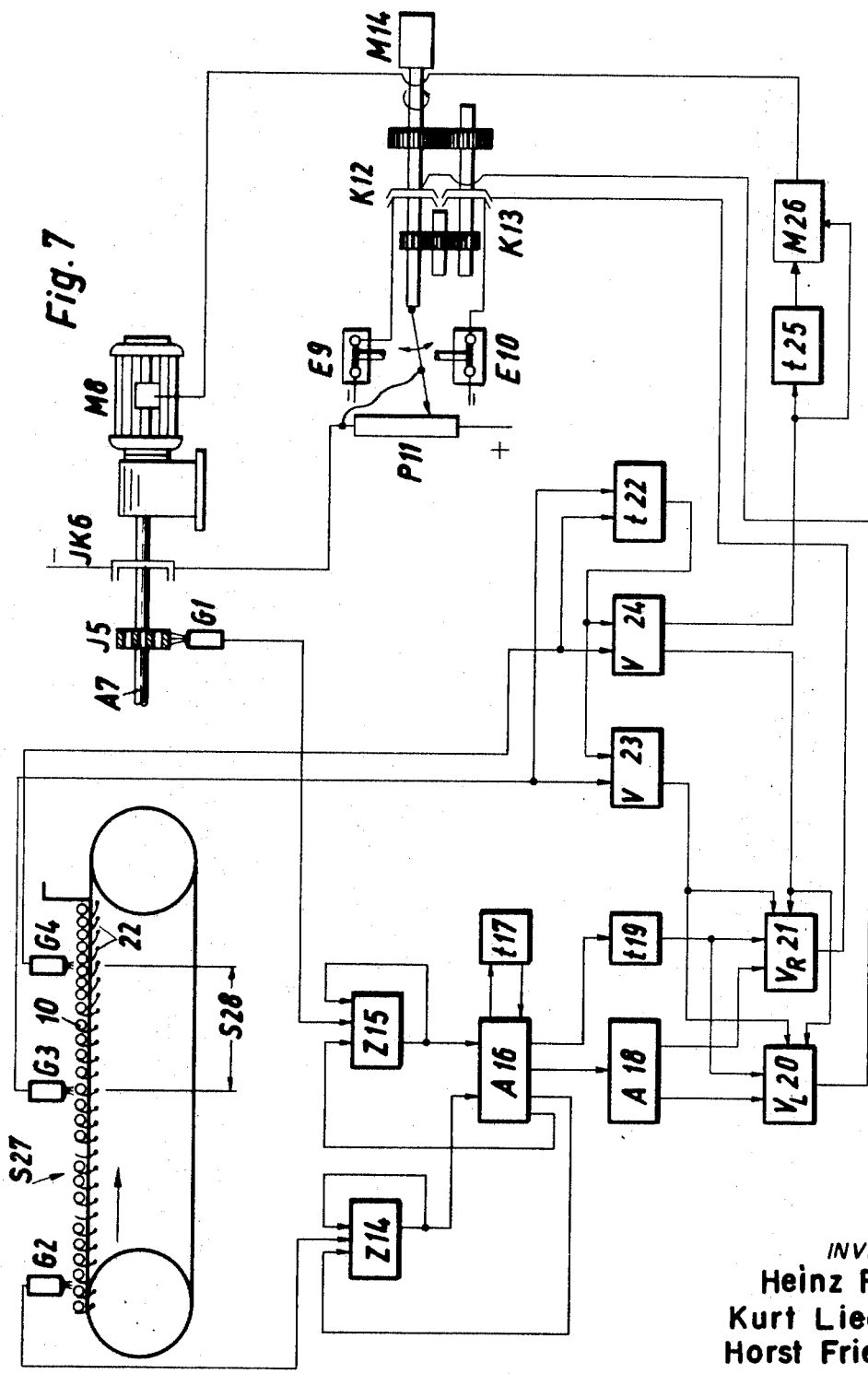

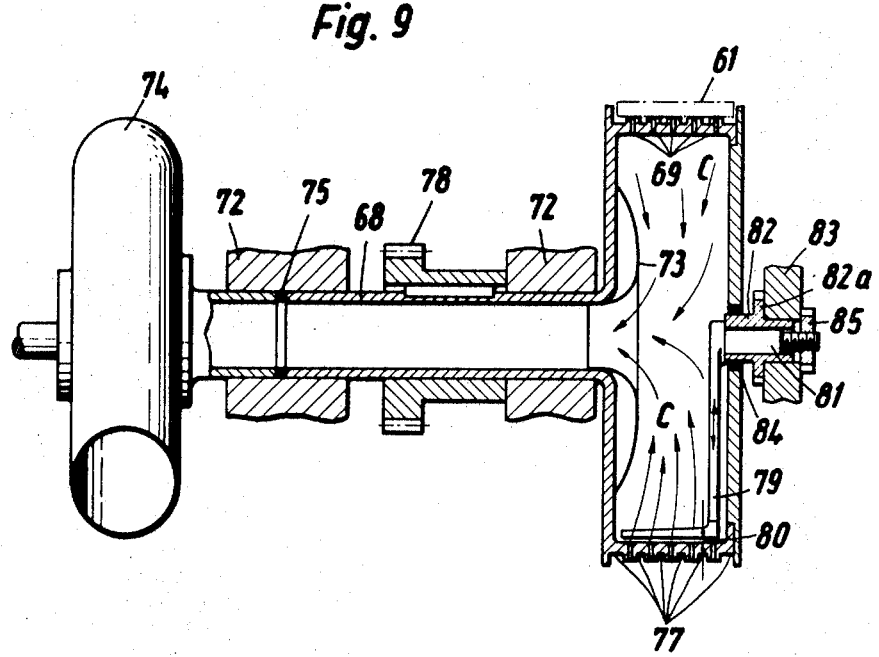
Fig. 9
Fig. 10
INVENTORS
Heinz Focke
Kurt Liedtke &
Horst Friedhoff
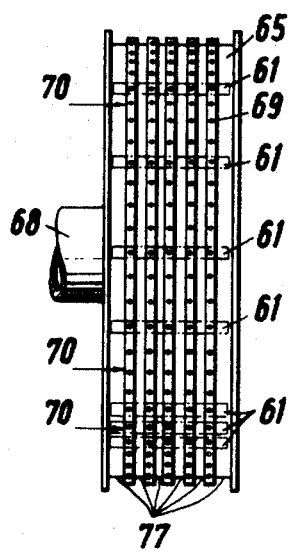
BY
ATTORNEY United States Patent Office 3,516,214
Patented June 23, 1970

3,516,214
APPARATUS FOR CONTINUOUSLY COLLECTING ELONGATED ARTICLES
Heinz Focke, Kurt Liedtke, and Horst Friedhoff, Verden (Aller), Germany, assignors to Focke & Pfuhl, Verden (Aller), Germany
Filed Apr. 28, 1966, Ser. No. 546,076
Claims priority, application Germany, Apr. 28, 1965, F 45,920; Apr. 13, 1966, F 48,931
Int. Cl. B65b 57/20, 19/28
U.S. Cl. 53—62                                         25 Claims

ABSTRACT OF THE DISCLOSURE

Cigarettes are positively conveyed by catches or suction to an endless conveyor from their reception in any random rhythm until they pile-up in a storage zone. The storage zone is defined by the endless conveyor and a guide spaced from the conveyor a distance equal to the thicknes of a cigarette. When the cigarettes pile up in the storage zone, the guide prevents them from jamming into a second, upper layer and the pile-up force causes the catches or suction to release the cigarettes.

---

The invention relates to an apparatus for the continuous collection of elongated articles, particularly cigarettes, conveyed, if desired, at varying distances from one another, in front of a stop, preferably for the purpose of transferring the cigarettes subsequently into the following packaging assemblies, such as trestles or a packaging machine.

The finished cigarettes coming out of the cigarette machines are conveyed at a distance from one another. If individual cigarettes have been removed before further processing as a result of a cigarette inspection in the course of the manufacture or examination, the cigarettes have, in certain cases, varying distances from one another, depending upon how many faulty cigarettes have been removed. These cigarettes may not be conveyed in a parallel relationship because of varying frictional resistances, for example at the filter side, on the one hand, and at the tobacco side, on the other hand. For the further processing of the cigarettes, namely for packing the same, they are first collecetd in a trestle. In this trestle, the cigarettes are received in layers, each layer comprising a large number of cigarettes, for example 60 cigarettes.

In the processing of cigarettes, the accumulation of the cigarettes before they are passed on to packaging assemblies, such as trestles or a packaging machine, represents a special problem. In particular, assurance must be obtained that the cigarettes are conveyed in parallel, and without large pressure, but with the cigarettes uniformly lying side-by-side in contact with one another. The continuously fed cigarettes must be combined, before they are introduced into the subsequent packaging assemblies, so that a layer is formed, the cigarettes lying relatively closely to one another. When the cigarettes are delivered at varying distances from one another on a conveyor belt, the first cigarette contacting a stop, and the subsequent cigarettes contacting the already accumulated cigarettes, there are frictional forces which arise between the traveling conveyor belt and the accumulated cigarettes to such an extent that the latter are damaged, squeezed, or otherwise subjected to deleterious influences. Moreover, there is the danger that individual cigarettes jump out of the layer to be formed, assume an oblique position, and thus form a second layer, or cause other disturbances.

One known trestle filler operates in such a manner that the cigarettes arriving with unequal spacings from a cigarette making machine are filled into collecting receptacles above a guide path, and from these receptacles, the cigarettes are fed at equal spacings through vibrating chutes to the guide path section wherefrom they arrive at a trestle. The use of vibrating chutes is undesirable since this causes tobacco to fall out of the cigarettes. Further disadvantages are that obstructing accumulations of cigarettes can easily occur in the receptacle above the vibrating chutes.

In another known device for feeding cigarettes coming from a cigarette machine to a trestle filler, the cigagettes delivered with unequal spacings are brought into close proximity to a suction bar provided with closely adjacent suction troughs. The respectively last free suction trough, seen in the conveying direction of the arriving cigarettes, is the only one free to exert suction. This trough attracts a cigarette and consequently the next free suction trough is free to exert its suction. A substantial disadvantage of this device is that the cigraettes lie without guidance on the conveyor belt before and within the region of the suction bar, whereby disturbances can easily arise because of shifting of the cigarettes.

It is the object of this invention to collect a plurality of cigarettes being delivered continuously and, in certain cases, with varying spacings between them, in front of a stop, to align these cigarettes, and accumulate them, in such a manner that the cigarettes lie relatively closely side-by-side, without the occurrence of squeezing, jamming, or other deleterious influences upon the cigarettes while they are collecting or while a large number of cigarettes is accumulating. In particular, the invention is to be employed in connection with the delivery of the cigarettes into a trestle or packaging machine.

In the following, further details of the invention are described in more detail with reference to embodiments for delivering cigarettes to a trestle illustrated in the drawings.

FIG. 1 shows a device according to the invention with catches mounted to endless chains, in a schematic longitudinal side view, partially in section;

FIG. 2 shows a cross-sectional detail of the device according to FIG. 1, in a varied position;

FIG. 3 is a top view, partly in section, of the device of FIG. 1;

FIG. 4 is a cross-sectional view taken along line IV—IV of FIG. 1;

FIG. 5 shows a side view of another embodiment of the invention with catches provided on a drum;

FIG. 6 shows a cross-sectional view taken along line VI—VI of the device of FIG. 5;

FIG. 7 is a schematic view with an electrical control diagram of an embodiment of this invention;

FIG. 9 is a cross-sectional side view of the storage drum taken along its axis;

FIG. 10 is a lateral view of the storage drum; and

FIG. 11 is an enlarged cross-sectional side view of the storage drum showing the air stream choke with its bearing.

Figure 8:
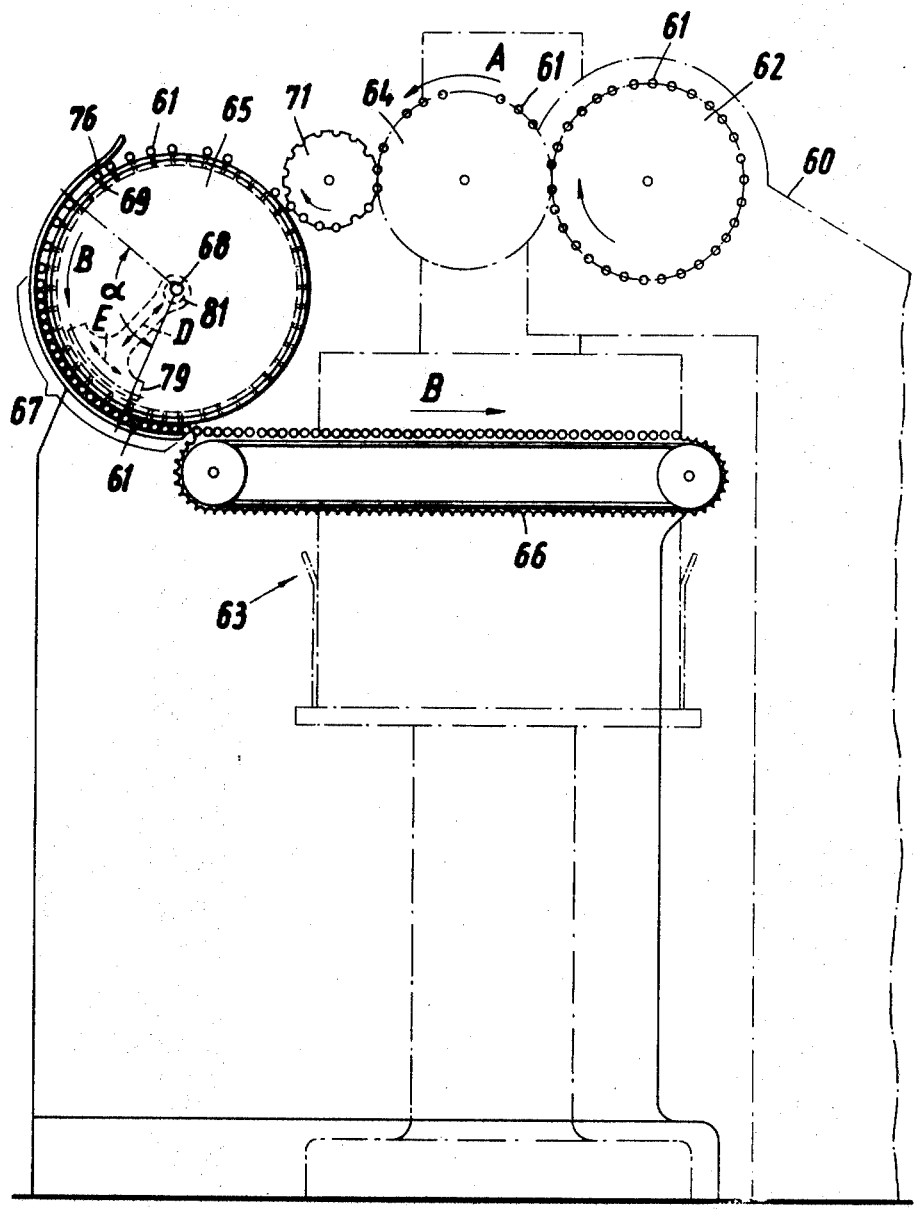
FIG. 8 shows a schematic side view of another embodiment of this invention.

FIGS. 1 to 6 illustrate one system of this invention characterized by an endless conveyor having movable entrainment means for cigarettes; these entrainment members can be moved out of the path of travel of the cigarettes when the cigarette contacts the stop or already accumulated cigarettes. According to the invention, the cigarettes are aligned and fed by movable entrainment members which, however, after the cigarette has piled-up by contacting a fixed stop or an already accumulated series of cigarettes, do not exert any further substantial pressure upon the cigarettes. Instead they are withdrawn from the path of travel of the cigarettes, so that the latter remain lying side-by-side, substantially free and without any larger stresses being exerted thereon. Thereby, it is possible to collect as large a number of cigarettes as desired in close relationship to one another in front of a stop or the like, and to align the cigarettes.

Preferably, the entrainment members according to the invention consist of pivotably mounted catches or pawls which can be pivoted rearwardly out of the path of motion of the cigarettes when the cigarettes contact the stop or already accumulated cigarettes. The pivoting movement takes place, according to a further essential feature of the invention, against the force of an adjustable resistance, particularly an adjustable frictional resistance. The frictional resistance is set so that the cigarettes are entrained by the catches before they arrive at a stop or at already accumulated cigarettes present in front of the stop. However, as soon as the cigarettes contact the stop, or cigarettes present in front of the stop, the frictional resistance is overcome, and the catches are at once pivoted out of the path of the cigarettes, so that the cigarettes remain lying freely side-by-side. Should the last cigarette of the series perhaps jump back, it is caught by the next catch and aligned by this latter catch.

The entrainment members of the invention, particularly being pivotable catches, can be attached, according to the invention, to endless chains, as well as to drums which are driven in a rotatable manner.

FIGS. 1 to 3 illustrate the invention when used for feeding individual cigarettes 10, having in some cases varying spacings from one another, to a trestle 11. The cigarettes 10 are delivered, for example, by a troughed wheel 12. The troughed wheel 12 deposits the individual cigarettes upon a conveyor 13 entraining the cigarettes 10 one after the other and conveying them toward the trestle 11, with the predetermined spacing still being maintained. The cigarettes 10 are collected or accumulated, before they are introduced into the trestle 11, in front of a stationary stop 14, in such a manner that the cigarettes lie relatively closely adjacent to one another, as shown in FIGS. 1 and 3 on the left-hand side of each figure.

The trestle 11 consists of a box, open on one side, into which the collected cigarettes 10 are pushed in the form of individual layers by means of a slide bar 15. After the delivery of one layer of cigarettes 10, the trestle is lowered by an amount corresponding to the thickness of the cigarettes, so that the next layer of cigarettes can be received. One layer of cigarettes consists, for example, of 60 cigarettes 10 positioned closely side-by-side.

The delivered cigarettes 10 are scanned by a reflex light barrier (counting device 16), and the impulses thereof are fed to a binary counter according to the transistor technique, this binary counter being encoded according to the Aiken Code. After attaining the number of cigarettes 10 desired in one layer (which can be set as desired, for example, 60), a brief control command is triggered by the binary counter. Thereby a movable stop 17 is actuated and lowered into the path of travel of the cigarettes 10, prohibiting any further delivery of cigarettes 10. Subsequently arriving cigarettes 14 accumulate in front of the movable stop 17. The movable stop 17 attached to a pivotably mounted arm 18 and biased by a spring 19 in the direction toward the path of travel of the cigarettes 10, is held in the starting position shown in FIG. 1 by an arresting lug or tongue 21, actuated that is retractable, by means of the electronic counting device 16 and a solenoid or an electromagnet 20. As soon as the arresting lug 21 is retracted by the electromagnet 20, the stop 17 jumps into the path of travel of the cigarettes. The following cigarettes 10 accumulate in front of the movable stop 17. Simultaneously, the counter of the electronic counting device 16 is set back to "START" and begins a new counting cycle. Thereafter, the electric blocking of the slide bar movement is released by the control pulse of the counter of the electronic counting device 16, and the slide bar 15 is moved at right angles to the conveyor 13, whereby the accumulated layer of cigarettes 10 is pushed into the trestle 11. Upon the subsequent return movement of the slide bar 15 into the starting position according to FIG. 3, the movable stop 17 is pivoted back into the starting position and is held by the resilient arresting lug 21 of the electromagnet 20. A conventional electronic scanning unit at the stop 17 blocks further movement of the slide bar 15, so that the latter—after reaching its final position—remains in the waiting position, according to FIG. 3, until it is again freed by the electronic counting device 16.

The conveyor 13 is fashioned in a special manner according to the invention. This conveyor consists of a plurality of pivotable catches 22, preferably attached at equal spacings from one another, which catches, in the embodiment of FIGS. 1 to 4, are mounted to endless chains 23, 24. By means of the catches 22, respectively one or, if desired, several cigarettes 10 are gripped (engaged) and carried along on a stationary conveying path 25. As soon as the cigarettes 10 contact the stop 14, or already accumulated cigarettes 10, or the movable stop 17, the pivotable catches 22 are pivoted to the rear, out of the path of travel of the cigarettes 10, so that they can run along below the cigarettes, as illustrated in FIG. 1 on the left-hand side. By action of an arcuate surface 29, the pivoted catches 22 are again set up before new cigarettes are engaged for entrainment.

Referring to FIG. 4, the catches 22 are preferably constructed to be double catches. They have two catch lugs 30 and 31, spaced from each other, between which the stationary conveying path 25 is located. The two catch lugs 30 and 31 are attached to a common hollow shaft 32, the latter being mounted, in turn, on an axle 33 extended at right angles through the members of the two chains 23 and 24. According to the invention, friction disks 34 and 35 are provided on at least one side of the catches 22 between the conveyor means and the catch means. At least one disk (friction disk 34) is connected with the catch 22. The frictional force between the friction disks 34 and 35 is adjustable with the aid of a compression spring 36 exerting its force upon the hollow shaft 32, as well as with the aid of an adjustment sleeve 37. For carrying out the invention, the friction is set such that the entrainment of one or several cigarettes 10 on the conveying surface 25 is possible by respectively one catch pair 22. As soon as the entrained cigarettes, however, encounter a resistance, the frictional force is overcome, and the catch lugs 30 and 31 are pivoted backwards, with a rotational movement of the hollow shaft 32. The use of a catch pair 22 with two catch lugs 30 and 31 has the advantage that the cigarettes are entrained in a particularly gentle and secure manner. When employing filter cigarettes, as illustrated in FIG. 4, at least one of the catch lugs (catch lug 30) engages the cigarette in the region of the filter 38.

FIGS. 5 and 6 show the use of the invention in connection with a conveyor shaped like a drum 39. The drum 39, rotatably driven, is provided at its outer circumference with a plurality of catches 40 which are provided, in correspondence with the construction of the catches 22 of the preceding embodiments, with two catch lugs 41 and 42 for engaging the cigarettes 10. The catch lugs 41 and 42 are seated on a common shaft 44 rotatably mounted in a bore of the shell or jacket of the drum, designated 43. The shaft 44 is preferably provided, in the region of the one catch lug 42, with a collar 45 extending all around, this collar being pressed, by a compression spring 46 exerting an axial force, onto an area 47 of annular shape on the drum jacket 43. The annular area of the collar 45 and the annularly shaped area 47 represent the frictional surfaces preventing a pivoting of the catches during the free entrainment of the cigarettes 10. The resistance created by the contacting frictional surfaces is overcome only when the cigarettes meet a resistance, for example a fixed stop or cigarettes which have already accumulated. When the cigarettes 10 are entrained by the catches 40, they contact an outer surface 48 of the drum jacket 43.

The free ends of the shaft 44 are guided in contact with a cam disk 50 through a lug 49 extending from the shaft. This cam disk 50 is constructed in such a manner that the catches, after having been pivoted backwards as a consequence of the cigarettes meeting a resistance, are again erected into the entraining position before new cigarettes are entrained. In the region of the accumulation of cigarettes, however, the catches remain in the back-pivoted position.

Both embodiments of the invention are distinguished by the fact that the cigarettes are entrained individually or several at a time by the catches 22 or 40, respectively, in a gentle manner. In the region of the accumulation of cigarettes, the catches move, automatically and without generating substantial pressure loads upon the already collected cigarettes, out of the path of motion of the cigarettes, so that the latter remain lying freely side-by-side. Additionally, in both embodiments of the invention, a guide 51 and 52, respectively, is provided securing the cigarettes on the free side. This guidance presents individual cigarettes from jumping out of the position wherein they are accumulated.

In the embodiment of FIGS. 5 and 6, the accumulated cigarettes are not passed directly to a trestle, but are passed one after the other to a further troughed wheel 53. From there, the cigarettes can be delivered to a trestle, for example.

The invention cannot only serve for the continuous accumulation but simultaneously for the alignment of the elongated articles, particularly cigarettes.

The control system of the embodiment of this invention shown in FIG. 7 is designed to continuously adjust the drive speed of the packaging assembly to the number of articles conveyed thereto per unit of time. The invention is characterized by an inductive (clutch) inserted between the main motor and the packaging assembly drive shaft, this coupling being adjustable by the comparative result of two electronic counting devices; one counting device scans the articles being conveyed and the other counting device scans a pulse generating disk rotating with the drive shaft of the packaging assembly. These features make it possible to adjust the drive speed of the packaging assembly to the number of the articles conveyed per unit of time, in a simple manner, such that the drive of the packaging assembly can be continuously adjusted. Intermittent operation is avoided except in extreme cases.

A further feature of this embodiment is that a storage buffer path is provided, and the regulation of the inductive coupling by the comparative result of the electronic counting devices is conducted solely during the accumulation of conveyed articles in the region of the storage buffer path. This function is provided by two electronic threshold value indicators for scanning the two ends of the storage buffer path or section, which serve, upon simultaneous response or non-response, to directly control the inductive coupling, the control thereof by the electronic counting devices being blocked.

The above-mentioned features offer the advantage that, in extreme cases when the storage buffer section is filled because of the conveyance of too many articles or when the storage buffer section is empty because too few articles are being conveyed thereto, this section is continuously varied in only one direction, with the continuous regulation of the drive speed being blocked.

Referring to FIG. 7, the pulse series emitted by photoelectric scanning units G1 and G2 (generators) in electronic counting devices Z14, Z15 are compared and evaluated by means of electronic evaluating members A16, A18. A highspeed servomotor M14 controls a potentiometer P11, through two connections or couplings K12 and K13, and thereby controls the slip of an inductive coupling JK6 at the main motor M8. From the inductive coupling JK6, the drive shaft extends to the packaging assembly, which is not shown. The articles 10 are delivered to the storage conveyor S27 in a manner not shown in the drawing. This storage conveyor is provided with a storage buffer path or section S28 whose ends are scanned by the two threshold value indicators G3, G4.

The pulse generator G1 is controlled by a pulse generating disk J5 on the secondary drive shaft of an inductive coupling JK6 and also drive shaft A7 of the packaging assembly. The emitted pulses are counted in an electronic counting device Z15.

Pulse generator G2 is controlled by the arriving articles 10, and delivers its pulses into a second electronic counting device Z14.

During normal operation, the pulse sequence at the pulse generator disk J5 (speed of rotation of machine of the packaging assembly) is equal to the number of individual articles 10, so that both counting devices Z14 and Z15 indicate "ZERO" simultaneously. Thereby, the entire system remains in the rest position. If, for example, the "ZERO" information first reaches the counting device Z15—controlled by the generator G1, this counting device is at once blocked for any further acceptance of pulses, and at the same time the evaluating member A16 and the time member t17 are actuated.

If, before a predetermined time period set in t17 has expired, the second counting device Z14 also becomes "ZERO," the evaluating member A16 remains blocked, and the two counting devices are freed by a setting pulse.

However, if the counting device Z14 is not reached by the "ZERO" indication during the duration of t17, the evaluating stage A16, after the time in t17 has elapsed, is actuated. The evaluating stage A16 at once blocks both counting devices for the further application of pulses thereto, and controls the amplifiers $V_L20$ and $V_R21$ via the evaluating stage A18, as well as simultaneously the adjustable time member t19.

For the set time in t19, both input stages of the amplifiers $V_L20$ and $V_R21$ are unblocked. The signal is put through the particular amplifier having a "ZERO" indication from the counting device applied thereto from the respective counter—in the example the amplifier $V_R21$.

The amplifier $V_R21$ actuates the coupling or clutch K13, and the potentiometer P11 is rotated, in this case toward higher ohmic values (decrease of the amperage). Thereby, the induction in the inductive coupling JK6 becomes weaker, and the slip of the clutch becomes greater. The speed of rotation of the drive shaft A7 of the packaging assembly, which is not shown, thus becomes lower. After the clutch K13 has been turned off, the counting devices Z14 and Z15 are set and again freed for counting the pulses anew.

When the counting device Z14 is first on "ZERO," the procedure takes place analogously to the operation described above in connection with Z15, with the difference that now the amplifier $V_L20$ is controlled, and thus the clutch K12 is attracting. Thereby the potentiometer P11 is turned to lower ohmic values, and thus the amperage in JK6 becomes higher. Thus the speed of rotation of the drive shaft A7 also increases.

Two electronic threshold value indicators G3 and G4 serve to monitor the filling of the storage buffer section. When the threshold value indicator G3 responds (storage buffer section full), the potentiometer P11 is set, via amplifier $V_{full}$ 23, to maximum amperages (lowest ohmic value), and the regulating process of the counting devices Z14, Z15 is blocked. The packaging assembly then runs at above the normal speed of rotation until the threshold value indicator G3 cuts off the amplifier $V_{full}$ 23, and the regulation by the counting devices Z14, Z15 is again initiated.

The threshold value indicator G4 responds as soon as the storage buffer section becomes empty (minimum indication); the amplifier $V_{empty}$ 24 is controlled, and the potentiometer P11 is set to high ohmic values via K13, so that the speed of rotation of the packaging assembly is constantly controlled, if desired to "ZERO." The regulation by counting devices Z14, Z15 is likewise blocked in this process step.

If, after a period of time set in the time member t25, the minimum indication has not ceased, a control command is applied to the control member M26 of the main motor M8, this command cutting the motor off. After the minimum indication has again been reached, the main motor M8 automatically starts operation again.

Two limit switches E9 and E10 turn off the clutches K13 and K12 after the respective final positions of the potentiometer P11 have been reached.

The alternative embodiment of the invention as shown in FIGS. 8 to 11 is designed to control the feeding of cigarettes, arriving at unequal spacings from one another from a cigarette machine at a trestle filler, by simple means; the control is effected such that the falling of tobacco from the cigarettes, as is the case with vibrating chutes is avoided, and a partially uncontrolled conveyance with the concomitant possibilities of disturbances, as is the case in a suction bar, is avoided. The cigarettes arriving at unequal spacings from the cigarette machine are to be brought into a close relationship with one another, without damage and without the development of disturbances, and are fed to a trestle filler continuously and securely.

This invention is characterized by a storage drum for storing the cigarettes, arriving one after the other at unequal spacings from one another, without mutual spacing in a closely adjacent relationship (densely packed position) and continuously delivering the cigarettes in this position. The invention makes it possible, on the one hand, to bring the cigarettes into the densely packed position without the danger of tobacco being lost and, on the other hand, to convey the cigarettes in a constantly controlled manner so that possibilities of disturbance are almost completely eliminated. This invention moreover offers the additional advantage, just as the process wherein a conveyor with catches is employed, that there is an increase in efficiency as compared to the conventionally used devices, since the conveying speed can be increased without disadvantageous results because the cigarettes are controlled along the entire conveying path.

Furthermore, in this embodiment a storage wheel is provided which can hold the cigarettes fed thereto in the correct position and with firm control. The storage drum, at its outer circumference is provided with a plurality of suction bores arranged in series axially to the drum axis and parallel to one another, these bores holding respectively one cigarette; the individual cigarettes can be fed to these suction bores by means of a synchronously rotating troughed wheel at proportionate spacings. The advantage of this embodiment is that, with a simple construction of the device, an absolutely secure guidance and control of the cigarettes is achieved, even when they are being delivered to or from the storage drum. With the storage drum construction shown, the cigarettes fed thereto at unequal spacings are brought to pile-up in a densely packed position without being damaged and without being less securely contained. The cigarettes are stored by this drum without mutual spacing, in a closely adjacent relation and the construction of the drum is simple. The storage drum can rotate more rapidly than the delivery speed of the cigarettes removed therefrom, so that the cigarettes accumulate in the conveying direction and thus are pushed toward one another to assume the densely packed position; at least in the zone of the storage drum where the cigarettes are closely packed, a guide strip for the cigarettes is provided. The advantage of this arrangement is that, merely by the simple means of having the storage drum rotate at a circumferential speed faster than the delivering speed of the cigarettes removed therefrom, the cigarettes are forced into a closely packed position because the suction bores have the tendency to entrain the cigarettes and release the cigarettes only after the cigarettes are so closely packed that they cannot be carried further along by their respective suction bores. The guide strip in the zone of the closely packed cigarettes prevents cigarettes stripped from the suction bores from falling away from the drum. The cigarettes are firmly controlled in their closely packed position by the guide strip. A further advantage of the present invention is the suction bores moving along underneath the cigarettes tend to push the cigarettes into a closely adjacent position, this being done with only a slight conveying effect which does not cause a deformation of the cigarettes but leaves them in their correct shape. A completely satisfactory closely packed position is achieved with a sufficient contact pressure between the individual cigarettes.

A further feature of this embodiment of the invention is that, when the cigarettes are closely packed, there cannot occur an undesirably strong vacuum which could lead to a deformation of the cigarettes due to the drum construction. The storage drum is provided with annular grooves arranged in planes at right angles to the axis of the drum and between the suction openings, in order to decrease the vacuum when the cigarettes are closely adjacent one another. The annular grooves are technically simple and inexpensive to construct; on the other hand, the desired effect is reliably obtained—namely the avoidance of a vacuum which is too high, affecting the cigarettes when they are closely packed, and possibly causing a deformation of the cigarettes.

Referring to FIGS. 8 and 9, this embodiment serves to feed cigarettes 61 coming from a cigarette machine 60 to a schematically illustrated trestle filler 63. In the drawings, the collecting drum 62 of the cigarette machine 60 can be seen. Between the device of the invention and the cigarette machine 60, a conventional filter-attaching machine, not shown in the drawing, can also be interposed if filter cigarettes are being manufactured. The cigarettes 61 are conveyed to the device of the invention in the direction of arrow A by means of a conventional feed wheel 64, the spacings between the individual cigarettes being sometimes irregular because of the removal of rejects.

The device is provided with a storage drum 65 for storing the cigarettes 61 arriving at non-uniform spacings in a closely packed relationship, without interspaces, and delivering these cigarettes in this position continuously in the direction of arrow B to the trestle filler 63 by means of an endless groove trough belt 66. The cigarettes are closely packed along a section designated by 67. This section 67 varies in length depending upon whether or not the cigarettes 61 are fed to the storage drum 65 at large spacings because of a large number of rejects.

As shown in FIG. 10, the storage drum 65 is provided, at its outer circumference, with a plurality of serially arranged suction bores 69 positioned axially to the axis 68 of the drum, in parallel, these bores serving for holding respectively one cigarette 61. The series are spaced at equal angular intervals around the drum circumference. The cigarettes 61 are fed to the individual series 70 of suction bores 69 by means of a rotating grooved wheel 71, having grooves spaced in an equal angular distribution therearound. Thereby, each cigarette 61 is held by exactly one series 70 of suction bores 69.

As shown in FIG. 9, the drum axle 68 is provided at the storage drum 65 and is rotatably mounted in bearings 72; this axle can be driven by means of sprocket 78. The drum axle 68 is a hollow shaft and serves for applying the vacuum to the storage drum 65. The latter is provided with an air baffle 73 in its interior to effect conductance of the air according to arrows C. The end of the drum axle 68 facing away from the storage drum 65 is connected with a stationary vacuum generator 74 by means of a threaded seal 75. Any conventional device can be used as the vacuum generator, for example, an exhaust fan or a suction pump.

The storage drum 65 rotates at a circumferential speed faster than the delivering speed of the cigarettes 61 therefrom. Thereby, an accumulation of the cigarettes 61 in the conveying direction and thus a positioning of the cigarettes 61 to the densely packed relationship are effected. The troughed belt 66 does not convey the cigarettes 61 onto the trestle filler 63 as rapidly as the conveying speed of the storage drum 65. A guide strip 76 for the cigarettes 61 is provided at least along the section 67 of closely packed relationship of the cigarettes in the storage zone of the storage drum 65. The guide strip 76 encompasses the storage drum 65 so that the greatest possible area of closely packed cigarettes is covered, indicated, for example, by the angle α.

As soon as the cigarettes 61 are placed into closely adjacent relation in the packed region 67, they are held solely by the guide strip 76 since the suction bores 69 slide along underneath the cigarettes.

The storage drum 65 is provided with annular grooves 77 arranged in planes at right angles to the drum axle 68 between the suction bores 69. These annular grooves serve to decrease the vacuum when the cigarettes are closely packed, so that a deformation of the cigarettes in this position is avoided.

This embodiment is constructed in such a manner that even very easily deformable cigarettes cannot be deformed in the region of closely packed cigarettes, designated 67, when the cigarettes are pushed toward one another. This result is obtained by providing an air stream choke 79. A surface of the choke 79 is positioned in the storage drum 65 adjacent to the jacket in the region of close adjacency or storage zone 67, oriented toward the suction bores 69 at a spacing or air gap 80; this air stream choke has the shape of a segment of a curve and can be adjusted in its position. By means of this air stream choke the conveying efficiency of the suction bores 69 of the storage drum 65 running underneath the cigarettes 61 is decreased since the suction of the bores passing this zone is decreased. By means of the air stream limiter 79, the conveying effect can be finely adjusted. The air stream choke 79 thus supplements the task and effect of the annular grooves 77 present on the storage drum 65. The annular grooves already eliminate the effect of the main part of the excess suction, while the air stream choke regulates the remainder of the suction to the desired degree in each particular case.

The air stream limiter 79 can be adjusted in the radial direction in the direction of double arrow D (see FIG. 11). It can furthermore be pivotably displaced in the direction of double arrow E (FIG. 8) for variable adjustment within the densely packed section 67. The air stream limiter 79 is supported by means of a pivot pin 81 in an eccentric bushing 82 having an adjustment collar 82a. The eccentric bushing itself is mounted centrally to the storage drum 65 and being rotatable by way of its adjustment collar 82a, in a stationary bearing 83. This bushing is sealed with respect to the storage drum 65 by means of a packing 84. By rotating the eccentric bushing 82, the air stream limiter 79 can be displaced in the radial direction according to double arrow D, and thus the spacing 80 (air gap) can be varied. The pivot pin 81 and the eccentric bushing 82 are held in their respective position by means of a nut 85.

Obviously many modifications and variations of the invention as hereinabove set forth can be made without departing from the essence and scope thereof, and only such limitations should be applied as are indicated in the claims.

The invention claimed is:

1. An apparatus suitable for continuously collecting elongated articles such as cigarettes delivered individually at an irregular rate for transfer to trestles or packaging machines, comprising an endless conveyor means and holding means thereon to hold the elongated articles during their movement from a receipt zone to a storage zone and to release the elongated articles on the occurrence of their piling up in the storage zone, said storage zone having at least a substantial portion thereof coinciding with the circumference of said conveyor means, said holding means being adapted to exert on said articles individually a predetermined force in the direction of displacement of said conveyor means, said holding means further comprising release means adapted to eliminate at least in part said predetermined force so as to release said articles, as said articles accumulate by piling up one by one against preceding articles already present in said storage zone and released from said conveyor means.

2. An apparatus as claimed in claim 1, said holding means further comprising a plurality of movable entrainment means mounted on said conveyor means, said entrainment means being adapted for movement between an entrainment position in which said entrainment means are projecting into the path of travel of said articles and a release position in which said entrainment means are out of the path of travel of said articles, whereby said entrainment means are individually moved out of said entrainment position into said release position as a result of said articles piling up one by one against preceding articles present in said storage zone and already released from said conveyor means; said holding means further including resetting means to move said entrainment means from said release position into said entrainment position.

3. The apparatus of claim 2 wherein the movable entrainment means are catch means pivotly mounted on said conveyor means for pivotal movement between said entrainment position and said release position.

4. The apparatus of claim 2 wherein the endless conveyor means is a drum.

5. The apparatus of claim 2 wherein the endless conveyor means is an endless conveyor belt.

6. The apparatus of claim 3 comprising adjustable resistance means in frictional engagement with the catch means for resisting the pivotal movement of the catch means from said entrainment position to said release position.

7. The apparatus of claim 3 wherein the catch means comprises a shaft means mounted on said conveyor means and having at least two outward extending lugs spaced apart along the axis thereof for entraining articles.

8. The apparatus of claim 7 wherein the shaft means is a hollow shaft mounted on an axle mounted on said conveyor means, said axle extending at right angles to the path of travel of the conveyor means.

9. The apparatus of claim 7 wherein the endless conveyor means is a drum having an outer cylindrical jacket, said jacket having bores extending axially with respect to the drum, and the shaft means being supportingly mounted in one of said bores.

10. The apparatus of claim 7 wherein said release means represent friction discs mounted between the shaft means and the conveyor means, and spring means for exerting an axial bias thereon, said bias being adjustable by changing the compression of said springs.

11. The apparatus of claim 7 wherein the articles conveyed are filter cigarettes, and at least one lug is positioned with respect to the path of travel of said cigarettes so as to contact the cigarettes in the filter zone.

12. The apparatus of claim 7 comprising a stationary transport surface extending from said receipt zone to said storage zone, said surface being located between two lugs of said catch means.

13. The apparatus of claim 7, said resetting means comprising a stationary arcuate surface for pivoting the catch means into said entrainment position, said arcuate surface being positioned behind said storage zone in the direction of conveyor means motion.

14. The apparatus of claim 12 comprising a stationary guide means opposite at least the storage zone of said transport surface and spaced therefrom for preventing jumping of articles from the transport surface.

15. The apparatus of claim 2, said conveyor means further comprising a stationary transport surface extending from said receipt zone to said storage zone, a first stop means at the forward end of said storage zone for terminating the path of travel of the articles, a movable second stop means located at a distance behind said first stop means and having a first position out of the path of travel of said articles and a second position blocking the path of travel of the articles between the receipt zone and the second stop means, counter means operatively connected to said second stop means for effecting movement thereof to the second position when a predetermined number of articles have been accumulated behind the first stop whereby further articles are accumulated behind the second stop means while the articles in the storage zone between said first and second stop means are removed therefrom.

16. The apparatus of claim 15 comprising a trestle means on one side of the storage zone of the transport surface and a transversely movable pusher means at the other side of the storage zone for pushing articles accumulated behind the first stop into the trestle.

17. The apparatus of claim 2 including a drive motor for a packaging machine supplied with articles from said endless conveyor, said drive motor being connected to the packaging machine drive shaft by an inductive clutch means, said packaging machine drive shaft having a pulse generator disc mounted thereon for rotation therewith, a conveyed article counting means for counting the number of articles conveyed along the endless conveyor, a generator disc pulse counting means for counting the revolutions of said drive shaft, regulator means connected to said inductive clutch means, conveyed article counting means, and generator disc pulse counting means for comparing the counts from said counting means and regulating the inductive clutch means in response to the comparative counts.

18. The apparatus of claim 17 wherein said storage zone includes a storage buffer zone at a distance behind the forward end of said storage zone on the path of said conveyor means, and detector means in said storage buffer zone operatively connected to said regulator means, said regulator means being adapted to restrict said comparison of the counts to the condition that articles are detected to pile up and accumulate within said storage buffer zone.

19. The apparatus of claim 18, said detector means including threshold value detectors at both ends of said storage buffer zone, said threshold value detectors being operatively connected to said regulator means and inductive clutch means, so that, when their response from both ends of said storage buffer zone is identical, they cause said comparison of the counts to be blocked and said inductive clutch means to be controlled directly to operate in a predetermined mode.

20. The apparatus of claim 1, said conveyor means further comprising a first stop at the forward end of said storage zone to arrest the forward motion of said articles, thereby causing said release means to become operative, said conveyor means further comprising a second stop located at a distance behind said first stop, said second stop being movable from an inoperative position outside the path of travel of said articles to an operative position blocking said path of travel, said second stop including counting means operatively connected therewith, so that, when a predetermined number of articles has been accumulated behind said first stop, said second stop is moved into said operative position, so as to arrest the forward motion of further articles arriving from said receipt zone, while the articles located inbetween said first and second stops are removed from the storage zone.

21. An apparatus as claimed in claim 1, said conveyor means further including stationary guide means spaced about the thickness of an elongated article from the conveyor means, said guide means extending over at least said storage zone portion which coincides with the circumference of the conveyor means so as to maintain the articles accumulated within said storage zone portion substantially in profile alignment.

22. The apparatus of claim 1 wherein said conveyor means is a drum having at its periphery a drum jacket, said holding means including a plurality of article entrainment means spaced at equal angular intervals around the outer circumference thereof, each of said article entrainment means comprising a series of suction openings extending through said drum jacket and defining an article entrainment position which is parallel with respect to the drum, said apparatus further comprising a rotating feeder means facing said receipt zone of said drum and aligned axially parallel to the drum, said feeder means having axially extending grooves spaced at equal intervals around the circumference thereof, said feeder means including drive means to move said grooves past said receipt zone in close proximity with, and in the same direction as said article entrainment means moving through said receipt zone to transfer said articles from said grooves of said feed means to the entrainment positions on said drum.

23. The apparatus of claim 22 comprising drive means connected to the drum for rotating it at a greater circumferential velocity than the velocity of articles delivered from the drum whereby the stored articles are closely packed between the drum and the stationary guide means.

24. The apparatus of claim 22 wherein said release means are in the form of a plurality of annular grooves arranged in the outer surface of said drum jacket, said grooves being located between said suction openings and adapted to decrease the suction effect from said article entrainment means in that portion of the storage zone which contains accumulated articles piled up against one another.

25. The apparatus of claim 22 said release means being in the form of a stationary air choke means having a surface adjacent the interior surface of said drum jacket, so as to form an air gap zone extending over at least a portion of said storage zone, said air choke means being adapted to decrease the suction effect upon the stored articles through the suction openings of said entrainment means during their motion past said air gap zone.

References Cited

UNITED STATES PATENTS

| 1,568,989 | 1/1926 | Molins | 53—148 |
| 1,964,084 | 6/1934 | Rundell | 53—245 |
| 3,089,297 | 5/1963 | Craig et al. | 53—78 X |
| 3,365,857 | 1/1968 | Liedke | 53—148 |
| 3,324,622 | 6/1967 | Schmermund | 52—236 XR |
| 3,241,286 | 3/1966 | Dearsley | 53—148 XR |

FOREIGN PATENTS

| 75,609 | 10/1946 | Czechoslovakia. |

THERON E. CONDON, Primary Examiner

R. L. SPRUILL, Assistant Examiner

U.S. Cl. X.R.

53—148, 236; 198—170